United States Patent
Lee et al.

(10) Patent No.: US 8,196,158 B2
(45) Date of Patent: Jun. 5, 2012

(54) METHOD FOR MEASURING AUDIENCE TO BROADCAST SERVICE AND CONTENT AT TERMINAL

(75) Inventors: Sangmin Lee, Gyeonggi-Do (KR); Seungjae Lee, Gyeonggi-Do (KR); Jihye Lee, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 128 days.

(21) Appl. No.: 12/751,339

(22) Filed: Mar. 31, 2010

(65) Prior Publication Data

US 2010/0257548 A1   Oct. 7, 2010

Related U.S. Application Data

(60) Provisional application No. 61/165,867, filed on Apr. 1, 2009, provisional application No. 61/183,967, filed on Jun. 3, 2009, provisional application No. 61/237,683, filed on Aug. 28, 2009, provisional application No. 61/239,050, filed on Sep. 1, 2009, provisional application No. 61/240,287, filed on Sep. 7, 2009, provisional application No. 61/263,401, filed on Nov. 23, 2009.

(30) Foreign Application Priority Data

Nov. 24, 2009   (KR) .................. 10-2009-0114136
Mar. 22, 2010   (KR) .................. 10-2010-0025473

(51) Int. Cl.
   *H04H 60/33*   (2008.01)

(52) U.S. Cl. ........................................... 725/9

(58) Field of Classification Search ................. 725/9–24
   See application file for complete search history.

(56) References Cited

U.S. PATENT DOCUMENTS 6,530,082 B1 *   3/2003   Del Sesto et al. ................. 725/9

FOREIGN PATENT DOCUMENTS

| KR | 1999-0018658 B | 4/2000 |
| KR | 2001-0069691 A | 7/2001 |
| KR | 2006-0058392 A | 5/2006 |

* cited by examiner

*Primary Examiner* — Dominic D Saltarelli
(74) *Attorney, Agent, or Firm* — Birch, Stewart, Kolasch & Birch, LLP

(57) ABSTRACT

Disclosed is a method of measuring audience ratings for at least more than one service and content in a terminal. The measurement method may include receiving a campaign invitation message for an audience measurement campaign from a server. The campaign invitation message may include at least more than one of information for the audience measurement campaign, information for the server, and information for an opt-in rate of the audience measurement campaign. The method may further include authenticating the information for the server in the campaign invitation message. The method may further include determining whether to participate using the information for the opt-in rate of the audience measurement campaign in the campaign invitation message. The method may further include transmitting a panel opt-in request message to the server according to the determination result. The method may further include receiving a panel opt-in response message from the server.

8 Claims, 9 Drawing Sheets

METHOD FOR MEASURING AUDIENCE TO BROADCAST SERVICE AND CONTENT AT TERMINAL

TECHNICAL FIELD

The present invention relates to broadcast audience measurement in a mobile environment.

BACKGROUND ART

In general, audience ratings are measured by broadcast stations or the like in order to check the popularity of predetermined programs being broadcasted by themselves, reflect on the production of next programs, and determine programs to be produced.

For a method of measuring audience ratings, there have been known various methods such as, a direct survey method for presenting a list of broadcast programs to a sample group to measure audience ratings, an over-the-phone survey method for making calls to viewers to measure program ratings currently being viewed at the time of broadcasting predetermined programs, a diary-type method for presenting a daily broadcast list for a specific period to the same panel each time and allowing viewers of the panel to directly write the viewed contents, and a meter-type method for measuring when and which channels have been set by predetermined generations using a mechanical device.

However, the forgoing survey methods have a problem in which audience ratings cannot be measured for viewers over a wide range of regions but only measured for those in a specific region, and the number of viewers who are subject to the audience measurement is too small if audience ratings are measured in real-time, and the reliability of measured audience ratings is very low if audience ratings are not measured in real-time.

Furthermore, since the appearance of automatic response systems, audience ratings have been measured by notifying an ARS phone number to viewers through television broadcast signals and then allowing viewers responding to an audience measurement to make phone calls. It makes possible to measure audience ratings for viewers over a wide range of regions, but on the contrary, has a difficulty that all television broadcast stations should notify their ARS phone numbers to viewers through television broadcast signals and also viewers should individually make phone calls.

DISCLOSURE OF THE INVENTION

Therefore, an object of the present invention is to solve the foregoing problem. In other words, an object of the present invention is to automatically carry out an audience measurement between a communication terminal and a system. Furthermore, an object of the present invention is to automatically carry out an audience measurement, thereby minimizing a user's troublesomeness. In addition, an object of the present invention is to reduce the user's troublesomeness, thereby acquiring a more correct response from the user, thereby increasing the reliability of measurement results. Furthermore, an object of the present invention is to provide an audience measurement method suitable for a mobile environment.

In order to accomplish the forgoing object, according to the present invention there is provided a method of measuring audience ratings for at least more than one service and content in a terminal. The measurement method may include receiving a campaign invitation message for an audience measurement campaign from a server. The campaign invitation message may include at least more than one of information for the audience measurement campaign, information for the server, and information for an opt-in rate of the audience measurement campaign. The method may further include authenticating the information for the server in the campaign invitation message. The method may further include determining whether to participate using the information for the opt-in rate of the audience measurement campaign in the campaign invitation message. The method may further include transmitting a panel opt-in request message to the server according to the determination result. The method may further include receiving a panel opt-in response message from the server.

On the other hand, in order to accomplish the foregoing object, according to the present invention, there is provided a terminal for measuring audience ratings for at least more than one service and content. The terminal may include a receiver configured to receive a campaign invitation message for an audience measurement campaign from a server, wherein the campaign invitation message includes information for the audience measurement campaign, information for the server, and information for an opt-in rate of the audience measurement campaign; a processor configured to authenticate the information for the server in the campaign invitation message, and determine whether to participate using the information for the opt-in rate of the audience measurement campaign in the campaign invitation message; and a transmitter configured to transmit a campaign opt-in request message to the server according to the determination result.

The campaign invitation message may be received via a service guide on a broadcast channel or received via a service guide on a unicast channel.

When receiving the panel opt-in response message, it may be possible to acquire configuration information for the audience measurement.

The configuration information may include information for the start and end of the audience measurement, information for an object to be monitored by the terminal, and information for a report of the audience measurement result.

The terminal may transmit an audience measurement report to the server using the information for a report of the audience measurement result.

The determination step may include generating an arbitrary value if there is an opt-in rate of the audience measurement campaign in the campaign invitation message; and comparing the generated arbitrary value with a value in the opt-in rate information. At this time, opt-in is determined if the generated arbitrary value is less than or equal to the value in the opt-in rate information.

The information for the audience measurement campaign may further include at least more than one of a first element indicating an identifier of the audience measurement campaign, a second element indicating a start time of the audience measurement, and a third element indicating an end time of the audience measurement, and information for the user's consent.

The method may further include checking whether or not there is a second element indicating a start time of the audience measurement in the campaign invitation message; and checking whether or not the current time has passed the start time of the audience measurement indicated in the second element.

In case where the panel opt-in request message includes information indicating opt-in refusal, the panel opt-in response message may include an element in which the end time of the campaign is set to the past.

The user's consent related information may include at least more than one of information indicating whether or not the user's consent is required, a name of the audience measurement campaign, and description information for the audience measurement campaign.

The opt-in rate information of the audience measurement campaign may be a randomSelector element.

On the other hand, in order to accomplish the foregoing object, according to the present invention, there is provided a method of measuring audience ratings for at least more than one service and content in a terminal, the method comprising: receiving, by a terminal having participating a campaign for audience measurement, a campaign participation response message from a server, wherein the participation response message includes a configuration data for the audience measurement, the configuration data includes at least one of a first element specifying an identification of the campaign for the audience measurement, a second element specifying a start time of the campaign and a third element specifying an end time of the campaign; comparing, by the terminal, the end time specified in the third element with a current time in response to the reception of the campaign participation response message; reporting, by the terminal, measurement data stored therein to the server if the end time is past; and stopping, by the terminal, participating the campaign for the audience measurement after the report.

The method may further comprise deleting the stored measurement data of the campaign indicated by the campaign participation response message. The method may further comprise transmitting, a campaign participation request message before receiving the campaign participation response message.

The campaign participation request message may include an element related to consent of a user, and the element includes a value indicating a reject by the user. The method may further comprises receiving, from the server, a campaign invitation message before transmitting the campaign participation request message. The campaign invitation message may include an element indicating whether a consent from a user is required or not.

The comparing may include comparing the identification specified in the first element with an identification for currently participating the campaign; and comparing, the end time specified in the third element with the current time if the identifications are matched each other.

On the other hand, in order to accomplish the foregoing object, according to the present invention, there is provided a method of measuring audience ratings for at least more than one service and content, the method comprising: transmitting a campaign invitation message to a terminal having participating a campaign for audience measurement, wherein the campaign invitation message includes at least one of a first element specifying an identification of the campaign for the audience measurement, a second element specifying whether a consent of a user is required or not; receiving, from the terminal, a campaign participation request message including a third element specifying an identification of the campaign for the audience measurement, wherein the identification of the third element is matched with the identification of the second element; transmitting, to the terminal, a campaign participation response message from a server, wherein the campaign participation response message includes a configuration data for the audience measurement, the configuration data includes at least one of a fourth element specifying the identification of the campaign for the audience measurement, a fifth element specifying a start time of the campaign and a third element specifying a value indicating an end time of the campaign, wherein the end time is set to past; and receiving, from the terminal, measurement data after transmitting the campaign participation response message.

On the other hand, in order to accomplish the foregoing object, according to the present invention, there is provided a terminal for measuring audience ratings for at least more than one service and content, the terminal comprising: a transceiver for receiving a campaign participation response message from a server, wherein the participation response message includes a configuration data for the audience measurement, the configuration data includes at least one of a first element specifying an identification of the campaign for the audience measurement, a second element specifying a start time of the campaign and a third element specifying an end time of the campaign; and a processor for comparing the end time specified in the third element with a current time, reporting measurement data stored therein to the server if the end time is past and stopping participating the campaign for the audience measurement after the report.

The present invention automatically carries out an audience measurement between a communication terminal and a system. Furthermore, the present invention automatically carries out an audience measurement, thereby minimizing a user's troublesomeness. In addition, the present invention reduces the user's troublesomeness, thereby acquiring a more correct response from the user to increase the reliability of survey results.

MODES FOR CARRYING OUT THE PREFERRED EMBODIMENTS

Figure 1:
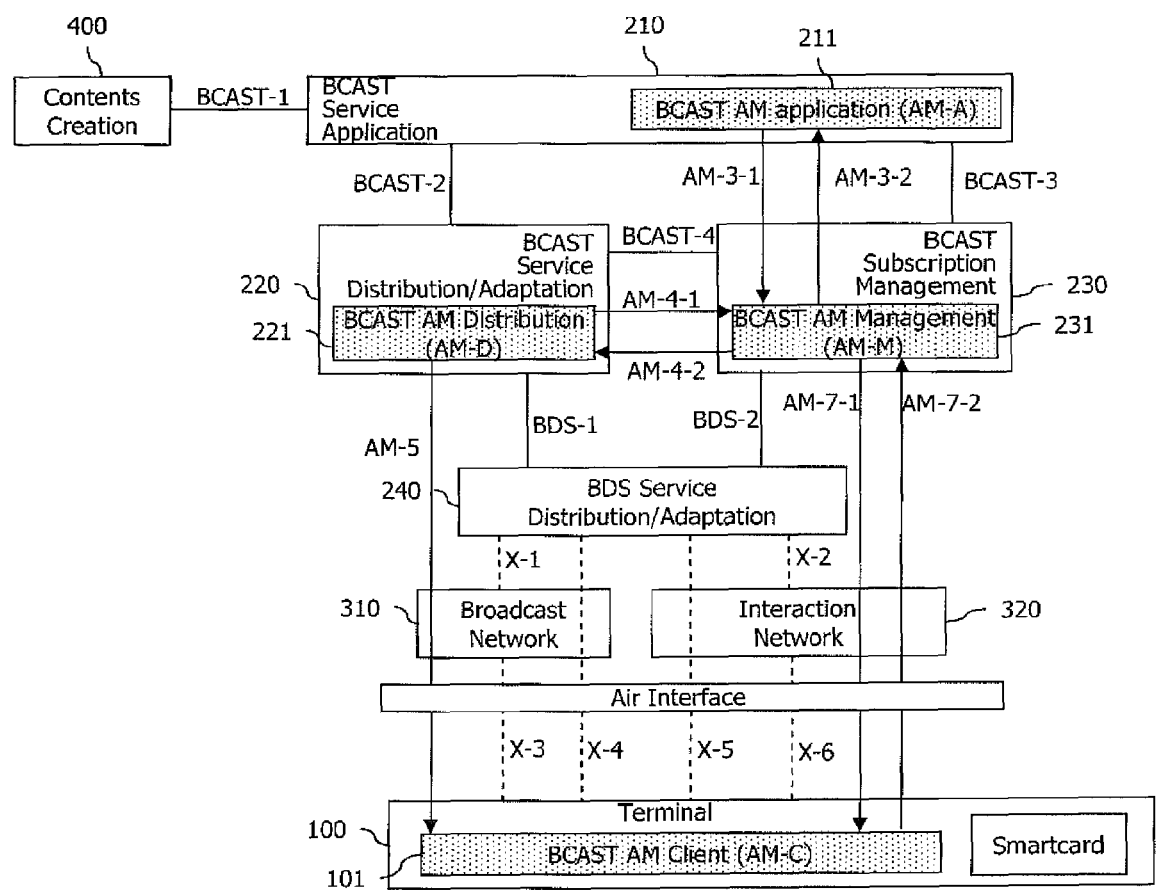
FIG. 1 is a configuration diagram illustrating an audience measurement system according to the present invention.

It should be noted that technological terms used herein are merely used to describe a specific embodiment, but not to limit the present invention. Also, unless particularly defined otherwise, technological terms used herein should be construed as a meaning that is generally understood by those having ordinary skill in the art to which the invention pertains, and should not be construed too broadly or too narrowly. Furthermore, if technological terms used herein are wrong terms unable to correctly express the spirit of the invention, then they should be replaced by technological terms that are properly understood by those skilled in the art. In addition, general terms used in this invention should be construed based on the definition of dictionary, or the context, and should not be construed too broadly or too narrowly.

Incidentally, unless clearly used otherwise, expressions in the singular number include a plural meaning. In this application, the terms "comprising" and "including" should not be construed to necessarily include all of the elements or steps disclosed herein, and should be construed not to include some of the elements or steps thereof, or should be construed to further include additional elements or steps.

The terms used herein including an ordinal number such as first, second, etc. can be used to describe various elements, but the elements should not be limited by those terms. The terms are used merely to distinguish an element from the other element. For example, a first element may be named to a second element, and similarly, a second element may be named to a first element.

In case where an element is "connected" or "linked" to the other element, it may be directly connected or linked to the other element, but another element may be existed therebetween. On the contrary, in case where an element is "directly connected" or "directly linked" to another element, it should be understood that any other element is not existed therebetween.

Hereinafter, preferred embodiments of the present invention will be described in detail with reference to the accompanying drawings, and the same or similar elements are designated with the same numeral references regardless of the numerals in the drawings and their redundant description will be omitted. In describing the present invention, moreover, the detailed description will be omitted when a specific description for publicly known technologies to which the invention pertains is judged to obscure the gist of the present invention. Also, it should be noted that the accompanying drawings are merely illustrated to easily explain the spirit of the invention, and therefore, they should not be construed to limit the spirit of the invention by the accompanying drawings. The spirit of the invention should be construed as being extended even to all changes, equivalents, and substitutes other than the accompanying drawings.

Hereinafter, the terms used in this specification will be briefly defined prior to describing an embodiment of the present invention.

Broadcast Service: A service capable of distributing contents to a lot of receiving terminals without being required to know who those terminals are. Such broadcast services may include, for example, mobile TV, mobile newspaper, and mobile file download (game, software upgrade).

Broadcast Channel: A logical channel for providing broadcast transmission, which is useful for a broadcast enabler to distribute data to a terminal in a broadcast/multicast manner. Typically, a broadcast channel supports high transmission rate, which is used for a downlink transmission. Such a broadcast channel is useful to transmit information to all or many terminals as a target.

Interaction Channel: A logical channel for a terminal to interact with a broadcast service in a point-to-point communication.

Broadcast Distribution System (BDS): Refers to a system capable of concurrently transmitting the same IP flow to many terminals. The BDS typically utilizes a technology for effectively using radio resources. The BDS includes a broadcast/multicast network function at a lower level of the IP layer and an additional service distribution/application function at an upper level of the IP layer.

Audience Measurement: The audience measurement is a method for measuring usage statistics related to the consumption of broadcast contents and services.

Audience Measurement Campaign: Refers to an audience measurement session generated by AM-M, which is carried out for a specific period of time for a specific user group. In the present invention, it is assumed that an audience measurement campaign ID is globally unique.

BCAST notification Message (Notification message): A function for transferring a one-way message from a broadcast server to a terminal. Typically, it is transferred in the form of broadcast via a BDS but it may be also transferred over an interactive channel in case of special circumstances. An address of the BCAST notification message may be included on a SGDD (XML document used for signalling information of a service guide). Hereinafter, both a BCAST notification message and a Notification message included in the SGDD may be used with the same meaning.

Hereinafter, the term "terminal" is used, but the terminal may be also called user equipment (UE), mobile equipment (MS), and a mobile station (MS). Furthermore, the terminal may be portable equipment such as a portable phone, a PDA, a smart phone, and a notebook, or non-portable equipment such as a PC, and a vehicle-loaded device.

FIG. 1 is a configuration diagram illustrating an audience measurement system according to the present invention.

Referring to FIG. 1, an audience measurement system according to the present invention may be on the basis of a broadcast (BCAST) architecture.

The illustrated terminal 100 as user equipment receives broadcast services related information such as broadcast contents, service guides, and content protection information. The user equipment may support an interactive channel. The terminal 100 may include a BCAST AM client (hereinafter, briefly referred to as "AM client" or "AM-C") 101. The BCAST AM client performs a role of notifying the user's panel opt-in/opt-out for a specific audience measurement campaign to a BCAST AM management unit, applying configuration information received form the BCAST AM management unit thereto, and preparing an audience measurement report to transfer to the BCAST AM management unit.

The audience measurement system may include a BCAST service application unit 210, a BCAST service distribution/adaptation unit 220, a BCAST subscription management unit 230, and a BDS service distribution/adaptation unit 240.

The BCAST service application unit 210 is an entity corresponding to an application unit of the broadcast service such as an audio/video streaming or movie file download. The BCAST service application unit 210 receives broadcast data from the content provider 400, encodes the data in a suitable form of broadcast, and supplies BCAST service attributes to the BCAST service distribution/adaptation unit 220 and the BCAST subscription management unit 230. Furthermore, the BCAST service application unit 210 can manage service charge information. The BCAST service application unit 210 may include a BCAST AM application unit. The BCAST AM application unit (referred to as "AM-application" or "AM-A") 211 provides a UI for manipulating a component for audience measurement (AM) or provides a function for analyzing the audience measurement result.

The BCAST service distribution/adaptation unit 220 is an entity in charge of combining BCAST services with a BDS. The BCAST service distribution/adaptation unit 220 carries out functions such as distribution of files/streams, combination of services, protection of services/contents, generation and transfer of service guides, and transfer of notification messages to be combined with a BDS. The BCAST service distribution/adaptation unit 220 may include a BCAST AM distribution unit. If a message sent from a BCAST AM management unit to a BCAST AM client is received, then the BCAST AM distribution unit (hereinafter, referred to as "AM distribution unit" or "AM-D") 221 performs a role of transferring the message via a broadcast network.

The BCAST subscription management unit 230 is an entity for performing a service provisioning such as subscription and payment, a transfer of information required for receiving BCAST services, and a management of the terminal. The BCAST subscription management unit 230 provides an interaction function of the BCAST service distribution/adaptation unit 220 for a notification message, a service protection management, a contents protection management, a service guide generation support, a terminal provisioning, a communication/subscription information management with the terminal. In addition, the BCAST subscription management unit 230 may also transfer user's payment information to the BCAST service application unit 210. The BCAST subscription management unit 230 may include a BCAST AM management unit. The BCAST AM management unit (hereinafter, referred to as "AM management unit" or "AM-M") 231 can manage a panel participating in an audience measurement, generate configuration information, and collect an audience measurement report.

The BDS service distribution/adaptation unit 240 is an entity for transferring broadcast services including a file/stream distribution and a service guide distribution to a BDS. Furthermore, the BDS service distribution/adaptation unit 240 may further carry out functions such as decryption key distribution, broadcast subscription management, and account management. The BDS service distribution/adaptation unit 240 is linked with an interaction network 320 to process a service discovery, a restricted service protection to a BDS, and other interaction functions. In addition, it is linked with a broadcast network 310 to transfer contents to the terminal 100.

On the other hand, the illustrated broadcast network 310 provides a content transfer function using a broadcast channel. The broadcast network 310 may accompany a radio network, which is similar to or different from a network used in an interactive channel.

The interaction network 320 provides an interactive channel. The interaction network 320 may accompany a radio network, which is similar to or different from a network used in a broadcast channel.

The content provider 400 is an entity for providing contents, and examples of the contents may be data such as movies, music discs, news texts, and the like. The content provider may provide a transfer paradigm (for example, streaming server), or basic material for the content description.

Hereinafter, an interface between the foregoing constituent elements will be described.

A BCAST-1 interface is used to transfer contents, content attributes, and notification messages. A BCAST-2 interface is used to transfer BCAST service attributes and content attributes belong to a program, such as contents-non-protection BCAST service, description, and genre. A BCAST-3 interface is used to transfer BCAST service attributes and content attributes belong to a service provision, such as user profile, and location information. A BCAST-4 interface is used to transfer notification messages, service guides, fragments (related to provision, purchase, and subscription), long-term key messages, short-term key messages, terminal-providing objects, terminal providing messages, and terminal management messages.

A BDS-1 interface is used to transfer non-protective or protective BCAST services, contents non-protection BCAST services, BCAST service attributes and content attributes, BCAST services/contents, notification messages, notification priorities, service guides, and the like. A BDS-2 interface is used to transfer service provision, subscription information, device management, and security data.

An X-1 interface is an interface between a BDS service distribution/adaptation unit and a BDS. An X-2 interface is an interface between a BDS service distribution/adaptation unit and an interaction network. An X-3 interface is an interface between a BDS and a terminal. An X-4 interface is an interface between a BDS service distribution/adaptation unit and a terminal. An X-5 interface is an interface through an interaction channel between a BDS service distribution/adaptation unit and a terminal. An X-6 interface is an interface through an interaction channel between an interaction network and a terminal.

An AM-3 interface is an interface between an AM-A and an AM-M, including an AM-3-1 and an AM-3-2 according to the direction thereof. An AM-4 interface is an interface between an AM-M and an AM-D, including an AM-4-1 and an AM-4-2 according to the direction thereof. An AM-5 interface is a wired/wireless interface through a broadcast network between an AM-D and an AM-C. An AM-7 interface is a wired/wireless interface through an interaction network between an AM-C and an AM-M, including an AM-7-1 and an AM-7-2 according to the direction thereof.

Figure 2:
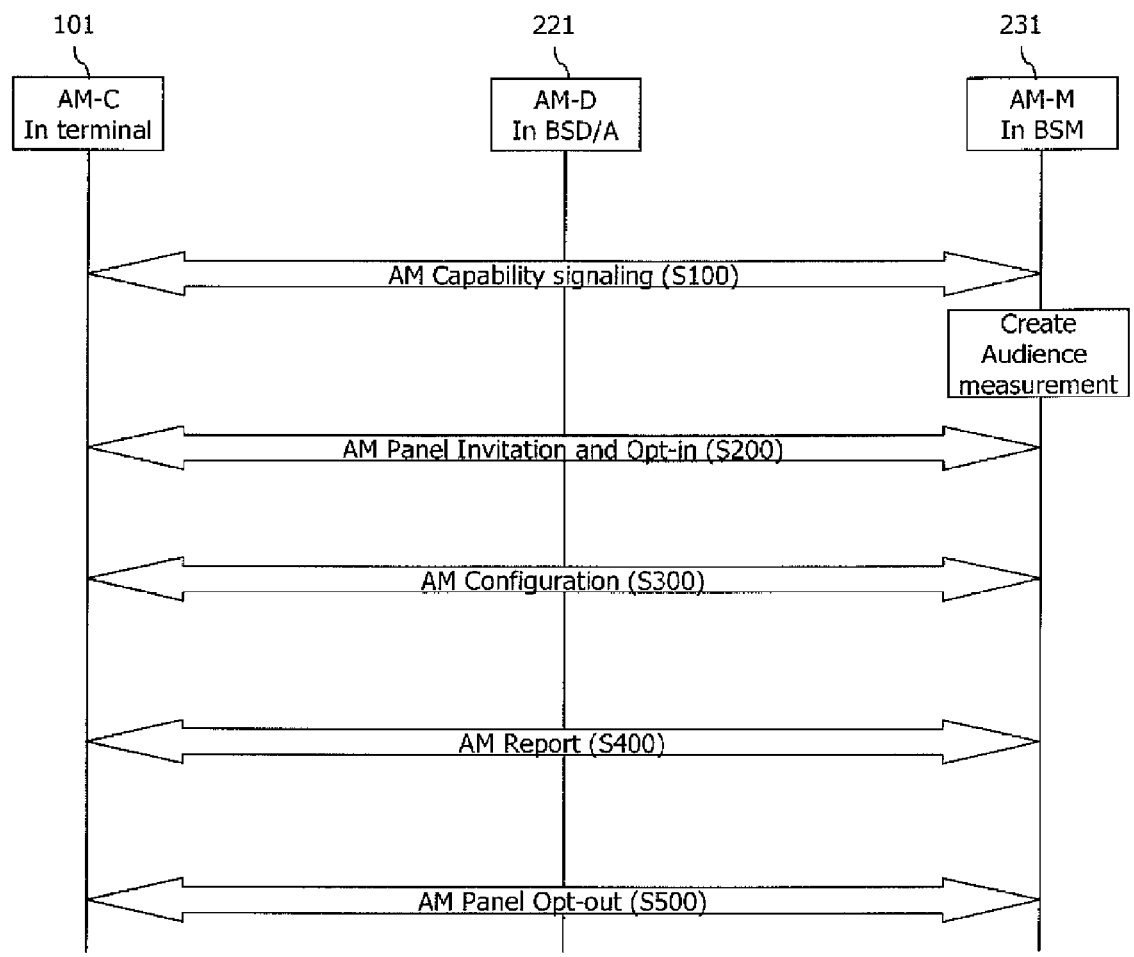
FIG. 2 is a flow chart illustrating the whole concept of a method according to the present invention.

FIG. 2 is a flow chart illustrating the whole concept of a method according to the present invention.

Referring to FIG. 2, the present invention may be roughly classified into five transactions such as an AM capability signaling process (S100), an AM panel invitation and opt-in process (S200), an AM configuration process (S300), an AM report process (S400), and an AM panel opt-out process (S500).

The AM capability signaling process (S100) is a transaction for allowing the AM-C 101 to notify its own capability of performing audience measurement to the AM-M 231, which can be selectively carried out. An AM-M between the AM capability signaling process (S100) and the AM panel invitation and opt-in process (S200) can generate an audience measurement campaign.

The AM panel invitation and opt-in process (S200) is a process for allowing the AM-M 231 to invite the AM-C 101 (a terminal, a broadcast service user, or user in a specific terminal), and allowing the AM-C 101 to request a panel registration to the AM-M 231 according to the invitation.

The AM configuration process (S300) is a process for allowing the AM-M 231 to send AM configuration data (initially transmit or update AM configuration information) to the AM-C 101. The AM configuration information may include information such as when and how audience measurement will be carried out for a specific audience measurement campaign, and how the audience measurement will be reported, and the like. The process may be omitted in case where a participation response message (for instance, opt-in response message) including audience measurement configuration information has been transferred in the AM panel invitation and opt-in process and updating of the AM configuration information is not required.

The AM report process (S400) is a process for allowing the AM-C 101 to prepare audience measurement data, which has been prepared according to the AM configuration information, as a report and transmitting to the AM-M 231.

The AM panel opt-out process (S500) is a process for opting out a panel participating in a specific audience measurement campaign.

A subject to be the panel may be a terminal, a user, or a user in a specific terminal. In order to allow the terminal to be a subject, an audience measurement context can be stored and managed in the terminal. Otherwise, in order to allow the user to be a subject, the audience measurement context can be stored and managed in a memory device such as a SIM or the like. Otherwise, in order to allow the user in a specific terminal to be a subject, the audience measurement context can be stored and managed for each user in the terminal.

Figure 3:
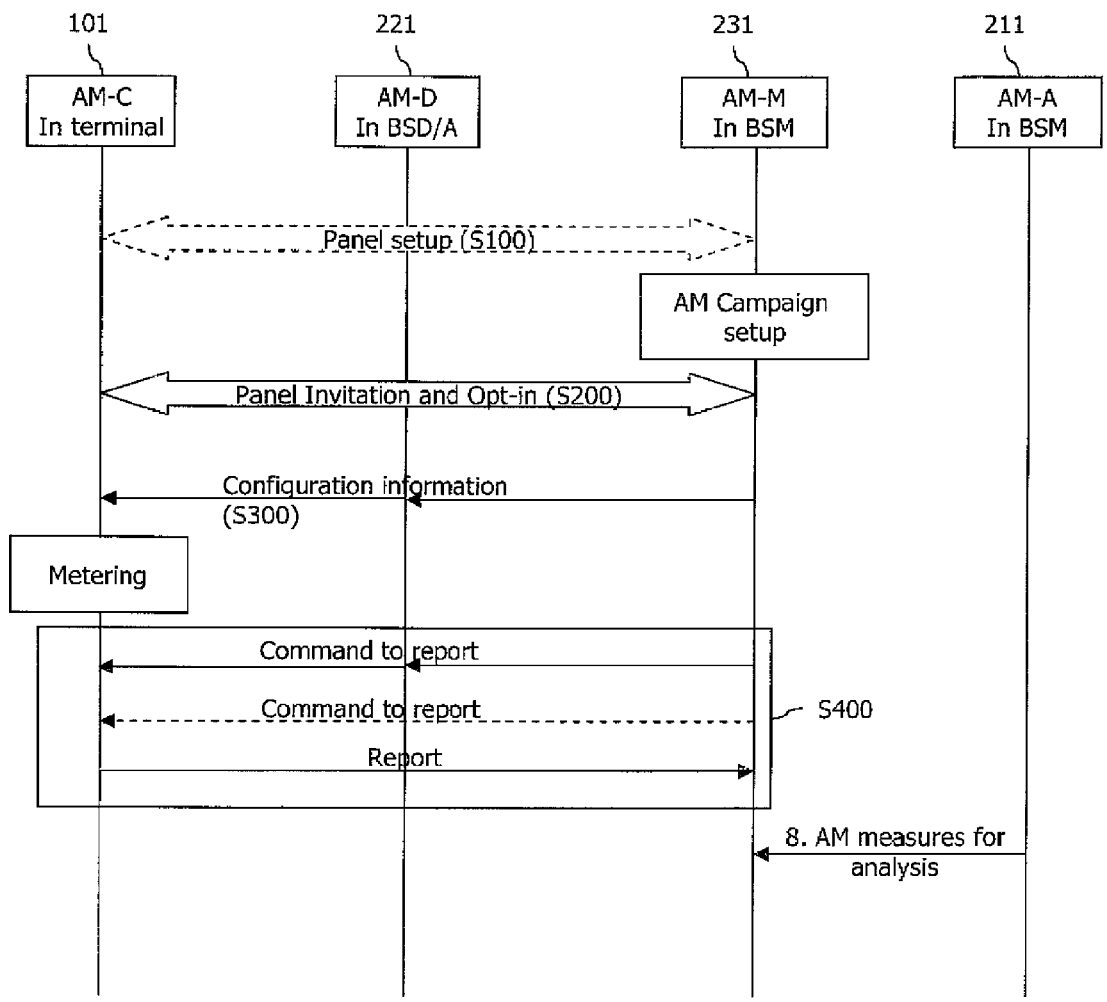
FIG. 3 is a flow chart schematically illustrating the concept illustrated in FIG. 2.

FIG. 3 is a flow chart schematically illustrating the concept illustrated in FIG. 2.

Selectively, the AM-C 101 is registered in the AM-M 231 to transmit information for its own execution capability. Through this process, the AM-M 231 configures a pool of the candidate panel for a later audience measurement campaign (S100).

The AM-M 231 generates an audience measurement campaign.

The AM-M 231 invites the AM-C 101 to a panel of the audience measurement campaign. The AM-C 101 transmits a participation message for the audience measurement campaign to the AM-M 231 according to the user's consent (S200).

The AM-M 231 generates configuration information, and transfers the generated configuration information to the AM-C 101 through a broadcast bearer of the AM-D 221 (S300). At this time, the configuration information may be directly transferred through a point-to-point communication method (for instance, SMS, MMS, and Http) between the AM-M 231 and the AM-C 101.

The AM-C 101 carries out audience measurement according to the configuration information.

The AM-M 231 generates a message for requesting the transmission of a report for the audience measurement, and transfers the message to the AM-C 101 through a broadcast bearer over the AM-D 221. Alternatively, the message may be directly transmitted to the AM-C 101 in a point-to-point communication method. In response to receiving the message, or in accordance with the configuration information, the AM-C 101 transmits the audience measurement report to the AM-M 231 (S400).

The AM-A 211 may receive, inquire and analyze the audience measurement from the AM-M 231. The details of a mechanism for the reception, inquiry, and analysis between the AM-A and the AM-M will be apparent to those ordinarily skilled in the art from this specification, and therefore, it will not be described in detail.

Figure 4:
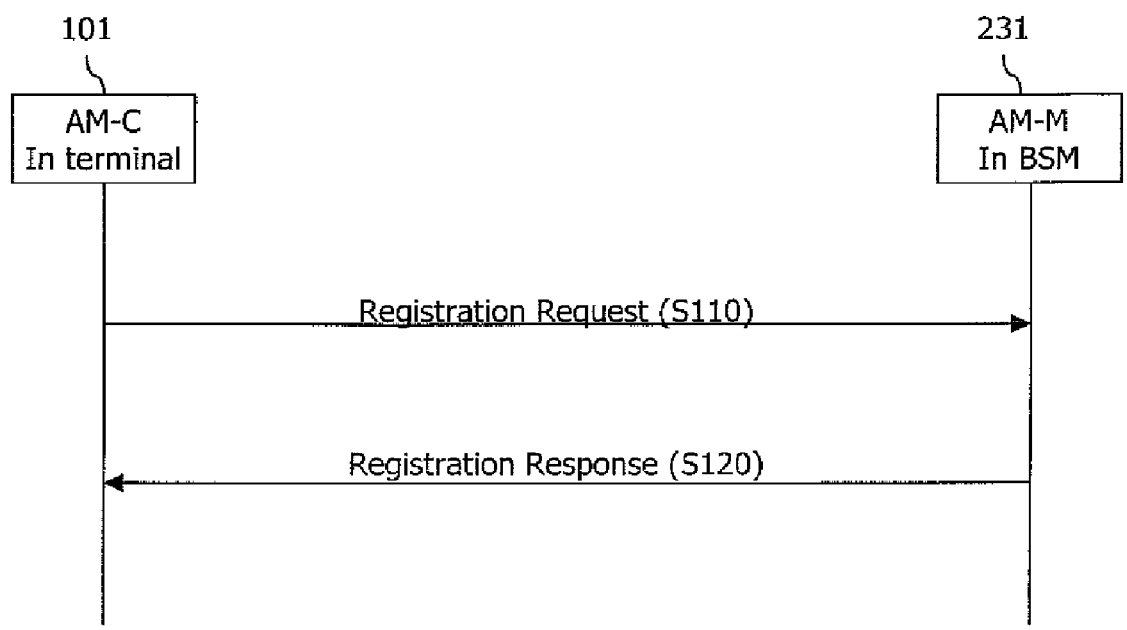
FIG. 4 illustrates the AM capability signaling process (S100) illustrated in FIG. 2.

FIG. 4 illustrates an AM capability signaling process (S100) illustrated in FIG. 2.

Referring to FIG. 4, the AM capability signaling process (S100) may include a registration request step and a registration response step.

First, in the registration request step, the AM-C 101 transmits a registration request message, for instance, Registration Request message (S110). The registration request message may include terminal_id, terminal_profile, and AM_profile. In addition, the registration request message may further include user_id and user_profile.

The terminal_id denotes an ID of the terminal, and internally includes a type indicating 3GPP, 3GPP2, DVB-H, and the like and a value of terminal ID. The terminal_profile denotes an AM-related attribute owned by the terminal, and internally may include supported_versioin indicating an audience measurement protocol version supported by the terminal, sec_algorithm indicating a security algorithm supported by the terminal, network_type indicating a supported broadcast network, screen_resolution indicating a supported screen resolution, and screen_size indicating a supported screen size.

The AM_profile can designate a terminal-centric solution or smartcard-centric solution. The AM-C is located in a terminal in case of the terminal-centric solution, and the AM-C is located in a smartcard in case of the smartcard-centric solution.

The user_id denotes an ID of terminal user, and internally may include a type indicating IMSI, URI, IMPI, MSISDN<MIN, and the like, and a value of user ID. The user_profile is information for explaining the user, and internally may include age, sex, occupation, academic background, address, and the like. The registration request message including the user information may be transmitted through a channel encrypted for personal information protection, for instance, HTTPS.

Next, in the registration response step, the AM-M 231 prepares and transmits a registration response message, for instance, Registration Response message in response to the registration request message (S120). The registration response message may include at least a success or failure of the processing.

Furthermore, the AM-M 231 can generate a database of the terminal or user on the basis of the registration request message. The generated database may be used for the statistical purpose of selecting a suitable terminal or user as a panel when the AM-M 231 performs the AM panel invitation process afterward, or may be used to select the object terminal or user to be transmitted when a panel invitation trigger message is to be transmitted through an interaction channel.

Figure 5:
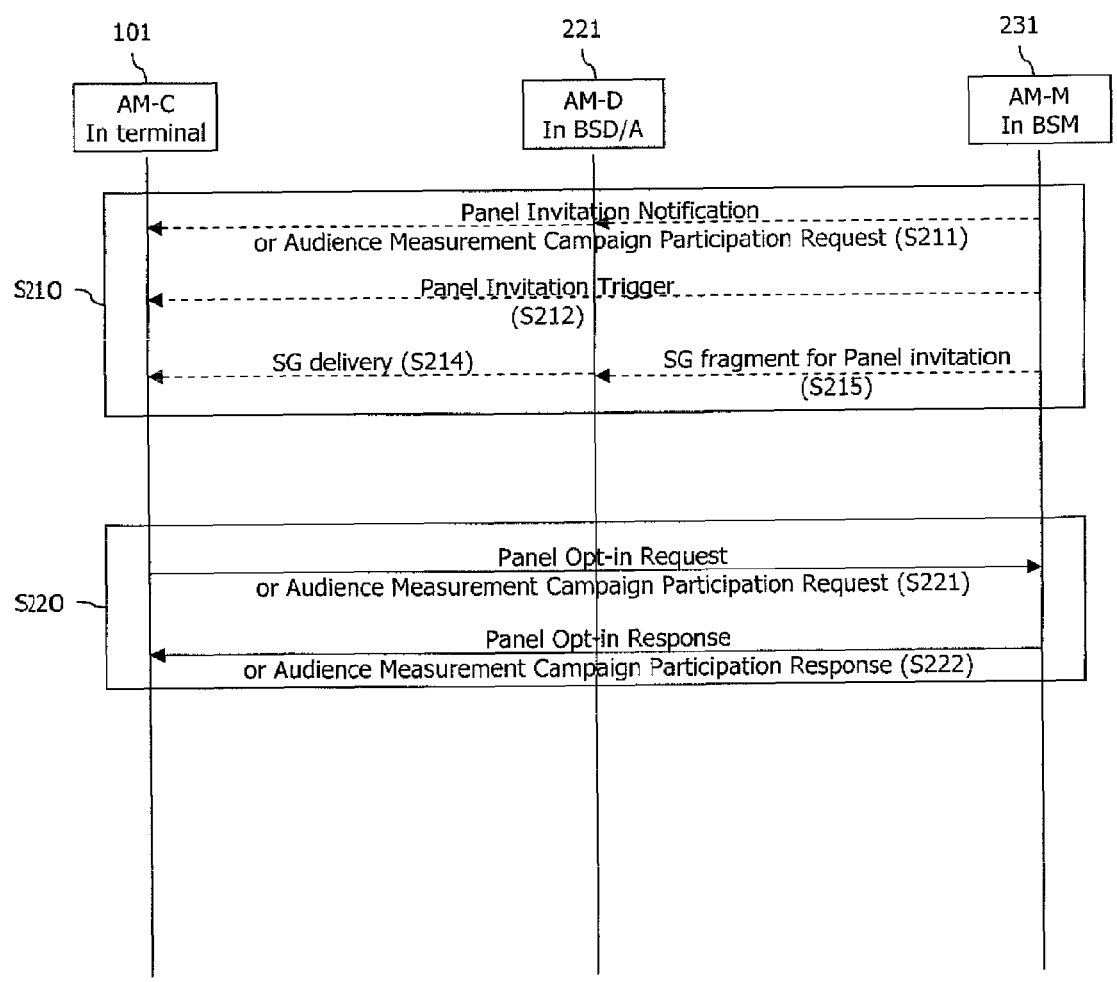
FIG. 5 is a flow chart schematically illustrating the AM panel invitation and opt-in process (S200) illustrated in FIG. 2.

FIG. 5 is a flow chart schematically illustrating the AM panel invitation and opt-in process (S200) illustrated in FIG. 2.

The panel invitation illustrated in FIG. 5 means a process in which the AM-M 231 sends a message in order to allow a specific or plurality of AM-C(s) 101 to participate in a specific audience measurement campaign. In addition, the opt-in means a process in which the AM-C 101 sends a message to the AM-M 231 and receives a response in order to participate in a specific audience measurement campaign.

Referring to FIG. 5, there are illustrated a panel invitation process (S210) and a panel opt-in process (S220).

1) The AM-M 231 can transmit a panel invitation notification message (for instance, Panel Invitation Notification), or audience measurement campaign invitation message to the AM-C 101 through the AM-D 221, namely, broadcast network, so that a user or terminal of the broadcast service may participate as a panel of the audience measurement (S211). The panel invitation notification message or audience measurement campaign invitation message may be used to filter out and select only some of all the broadcast receiving terminals.

Alternatively, the AM-M 231 can transmit a panel invitation trigger message (for instance, Panel Invitation Trigger message) or audience measurement campaign invitation message (for instance, Audience Measurement Campaign Invitation message) through an interactive network (S212). The panel invitation trigger message or audience measurement campaign invitation message may be used to inform that a candidate is chosen as a chosen terminal after the candidate of the panel has been previously chosen by the server, and may be transferred through WAP-Push, SMS, MMS, and Http, for example.

Alternatively, the AM-M 231 can transmit a service guide (SG) for panel invitation. The service guide will be described later.

2) If the panel invitation notification message, audience measurement campaign invitation message, panel invitation trigger message, or audience measurement campaign invitation message is received, then the AM-C 101 processes the message as follows.

First, the AM-C 101 verifies or authenticates information on the server included in the panel invitation notification message or audience measurement campaign invitation message. For example, the AM-C 101 verifies whether or not a URL of the server for performing audience measurement is correct using ServerAddressURL included in the panel invitation notification message or audience measurement campaign invitation message.

Then, the AM-C 101 checks whether or not there is information on a start time of the campaign in the panel invitation notification message, panel invitation trigger message, or audience measurement campaign invitation message. If there is information on a start time of the campaign, then the AM-C 101, then the AM-C 101 checks whether or not the current time passes the start time. If the current time passed the start time, then the AM-C 101 internally refuses the audience measurement campaign invitation (ignores the message.)

Then, the AM-C 101 determines whether or not a terminal or user of the terminal can be a panel using a filter (PanelFilter, samplePercentage) in the notification message, and displays the content included in the notification message on the display unit to ask for the user's consent.

If the panel invitation trigger message or audience measurement campaign invitation message is received, then the AM-C 101 displays the content included in the trigger to inform the user, and obtains the user's consent.

If a service guide (including a service fragment in which the service type of the service guide is "audience measurement" and its associated SG fragment) for the panel invitation is received, then the AM-C 101 checks whether or not the AM-C 101 itself can be a panel from a parameter included in the service guide to ask for the user's consent.

At this time, if it is checked that a subscription is required to participate in the audience measurement campaign by the service guide, then the AM-C 101 asks for the user's consent, and then transmits a subscription request message defined in the OMA BCAST 1.0 to the AM-M. The AM-M 231 checks the legitimacy of the subscription request message, and then generates a subscription response message including at least a success of failure of the processing, and then transfers the generated message to the AM-C 101. The subscription response message may further include a long-term key message (LTKM) including a service encryption key (SEK) if an encryption is required for personal information protection between AM-C and AM-M. At this time, the SEK may be used to encrypt a specific portion of the message defined by the present invention.

If the AM-C 101 asks for the user's consent according to one of the three types, then a panel participation request message (for instance, Panel Opt-in Request message) or audience measurement campaign participation request message (for instance, Audience Measurement Campaign Participation Request message) is generated and transmitted to the AM-M 231, thereby allowing the terminal or user to be registered as a panel for the AM-M 231 (S221). The panel participation request message or audience measurement campaign participation request message can be referred as a Audience Measurement Request message. The panel participation request message or audience measurement campaign participation request message will be described later.

If the panel participation request message or audience measurement campaign participation request message is received, then the AM-M 231 processes the message as follows.

In an audience measurement campaign corresponding to the campaign ID of the request message, it is checked that a terminal ID or user ID or a pair of the terminal ID and user ID has not been subscribed yet.

According to the check result, the AM-M 231 generates a panel participation response message (for instance, Panel Opt-in Response message) or audience measurement campaign participation response message (for instance, Audience Measurement Campaign Participation Response message) including a success or failure of the processing to the AM-C 101 (S222). At this time, the AM-M 231 may include AM configuration data in the response message. At this time, if the user's consent is refusal, then a CampaignStartTime element in which the start time of the campaign is set to the past can be inserted into the panel participation response message or audience measurement campaign participation response message.

On the other hand, if the processing result in the response message is "Success" after the AM-C 101 receives the response message, then an audience measurement context including a campaign ID, an ID (AM-M_ID) of the AM-M 231, and the AM-M 231 URL will be generated. At this time, if a time indicated in a CampaignEndTime (campaign end time) at a lower level of the AMConfiguration Container element within the panel participation response message or audience measurement campaign participation response message is the past compared to the current time of the AM-C 101, then the AM-C 101 does not proceed into the following procedure. However, if the processing result is an error, then the content of the error is displayed for the user, thereby finishing the transaction. At this time, the AM-C 101 deletes the audience measurement context of the campaign, and regards the panel qualification for the campaign as being lost, and suspends the audience measurement of the campaign.

On the other hand, the panel invitation notification message, the panel invitation trigger message, and the service guide will be described below.

Panel Invitation Notification Message

The panel invitation notification message can be transmitted through a notification message of the BCAST or other messages performing the same function. The notification message typically transferred through a broadcast network, but may be transferred through an interaction network in case of special circumstances.

Hereinafter, the examples of an XML schema illustrating a structure of the panel invitation notification message will be described.

The AM panel invitation element includes a panel element. If a value of the panel element is "0" (i.e., in case where the unit of panel is a user), then audience measurement data will be recorded for each user, and a report to be transferred to the AM-M 231 will be also prepared for each user. On the contrary, if a value of the panel element is "1" (i.e., in case where the unit of panel is a terminal), then audience measurement data will have all events that have been occurred in a terminal. On the other hand, if a value of the panel element is "2" (i.e., in case where the unit of panel is a specific user of a specific terminal), then events will be recorded for each user in the terminal.

The AMPanelInvitation element represents a condition for which a terminal or user receiving the panel invitation notification message becomes a panel or a benefit when the terminal or user has been a panel. The AMPanelInvitation element may include a panelType element, a termsOfCondition element, a PanelFilter element, a campaignID, a campaign- Name attribute, a campaignDescription attribute, a samplePercentage (or randomselector) attribute, and a requestURL attribute.

The termsOfCondition element is expressed by a period of audience measurement participation, a legal basis, an advantage of participation, a privacy-related expression, and the like as a text string. The termsOfCondition element may be omitted, and in this case part of the content may be included in the campaignDescription. The PanelFilter describes the qualification of a panel, and may be configured with an "AND" condition for combining a location, TargetProfile, and FilterID. The location is expressed by a URI, and for example, the URI indicating "Gyeonggi-do in Korea" may be a value thereof. In the TargetProfile, the attribute of the user of terminal is expressed by a pair of name/value, and for example, it may be restricted by a male above the age of four if (name='gender', value='male') and (name='age', value='4+'). The FilterID represents an ID known as a URI type in advance to express a filter. The TargetProfile may further include (name='on Roaming', value='false') to delete a user roaming another broadcast network from the panel candidates. The campaignID is an identifier for discerning an audience measurement campaign. In other words, several audience measurement campaigns may exist in one broadcast service.

sage, and compares the extracted value with a value of the samplePercentage (or randomselector) attribute, and then ignores and does not processes any more if the arbitrary value is greater. The requestURL represents an address for transmitting a panel participation request message. The AMPanelInvitation is added as a lower element of the Notification Message element to be transferred from the AM-D to the AM-C when a panel notification message is transferred through a broadcast notification message, or the panel notification message is added as a single lower element of the SGDD to be transferred from the AM-D to the AM-C.

Panel Invitation Trigger Message

The panel invitation trigger message is a message transferred from the AM-M 231 to the AM-C 101 of a specific terminal intended by the AM-M through an interactive network such as WAP-Push, SMS, MMS, and Http. In case where the panel invitation trigger message is transferred through a WAP-PUSH, the message is transferred to a specific user regardless of whether the terminal uses a SIM, and thus the unit of panel will be a user or a pair of the terminal and user that have received the message at present.

The panel invitation trigger message may be configured as illustrated in Table 1 as follows.

TABLE 1

| Name | Description |
| --- | --- |
| campaignID | Identifier of an audience measurement campaign |
| campaignStartTime | Time at which the measurement is started. This parameter may be used for the purpose of previous filtering. For example, duplication of an audience measurement campaign over the time is prevented. |
| campaignEndTime | Time at which the measurement is completed. This parameter may be used for the purpose of previous filtering. For example, duplication of an audience measurement campaign over the time is prevented. |
| CampaignName | Name of an audience measurement campaign |
| CampaignDescription | Description of an audience measurement campaign |
| UserConsentRequired | Denotes whether the user's consent is required at the time of campaign participation |
| PanelType | 0: user unit, 1: terminal unit, 2: user & terminal unit |
| ServerAddressURL | URL of an audience measurement server |
| AdditionalInfoAddressURL | URL of a device having additional information associated with the campaign |
| PanelFilter | Panel filtering rules |
| samplePercentage | Sampling rate for filtering a panel of the audience measurement |

The samplePercentage (or randomselector) attribute is used to select only part of all the terminals that have received the notification message as a parameter for extracting any statistically meaningful samples. The samplePercentage (or randomselector) attribute has a value from "0" to "100" and it is interpreted as "100" if omitted.

For an example of the samplePercentage (or randomselector) attribute, the AM-C 101 extracts any number from "0" to "100" if the samplePercentage (or randomselector) attribute exists in the audience measurement campaign invitation mes- Audience Measurement Campaign Invitation Message The audience measurement campaign invitation message is a message transmitted from a server to a terminal in order to invite the terminal into an audience measurement campaign. The message may be also used to trigger a process for reconfigure the existing campaign. The audience measurement campaign invitation message may be transmitted through an SMS, service guide or HTTP. The Audience Measurement Campaign Invitation message can be referred as an Audience Measurement Trigger message.

TABLE 2

| Name | Description |
| --- | --- |
| AudienceMeasurementCampaignInvitation | Includes following attributes. campaignID, campaignStartTime, campaignEndTime Includes following elements. UserConsentInformation, ServerAddressURL, AdditionalInfoAddressURL |

TABLE 2-continued

| Name | Description |
|---|---|
| campaignID | Identifier of an audience measurement campaign |
| campaignStartTime | Expected time at which the measurement is to be started. This parameter may be used for the purpose of previous filtering. For example, it is used to filter out duplicated campaigns if a terminal cannot concurrently support several campaigns. |
| campaignEndTime | Expected time at which the measurement is to be completed. This parameter may be used for the purpose of previous filtering. For example, it is used to filter out duplicated campaigns if a terminal cannot concurrently support several campaigns. |
| UserConsentInformation | User's consent information is required to participate in a campaign. Includes following attributes. consentRequired, Includes following elements. CampaignName, CampaignDescription |
| consentRequired | Terminal can silently perform participation if user's consent required for campaign participation is set to False. User's consent should be obtained if it is set to True. |
| CampaignName | Name of an audience measurement campaign |
| CampaignDescription | Description of an audience measurement campaign. Information displayed for user. Includes the ground of change in case of reconfiguring a campaign. |
| ServerAddressURL | URL of a server to which an audience measurement campaign request message is sent. Terminal verifies or authenticates the URL. |
| AdditionalInfoAddressURL | URL for additional information associated with the campaign |

Service Guide for Panel Invitation

The elements/attributes added or changed for a service fragment of the service guide for panel invitation are illustrated in Table 3 as follows.

TABLE 3

| Name | Description |
|---|---|
| samplingRatio | If a value of Service Type parameter is "11" (audience measurement), the samplingRatio parameter is used for the purpose of allowing the AM-M 231 to select a constant percent of samples as a panel among terminals satisfying both TargetUserProfile and/or BroadcastArea. The samplingRatio parameter has a value from "0" to "100". |
| ServiceType | Denotes the type of a service. Denotes an audience measurement if a value of ServiceType parameter is "11". |
| Name | Name parameter has the name of a specific audience measurement campaign if a value of ServiceType parameter is "11" (audience measurement). |
| Description | Description parameter has the description of a specific audience measurement campaign if a value of ServiceType parameter is "11" (audience measurement). |
| TargetUserProfile | TargetUserProfile parameter describes User Profile among the qualifications of a panel capable of participating in a specific audience measurement if a value of ServiceType parameter is "11" (audience measurement). The terminal verifies a qualification by comparing the TargetUserProfile parameter with User Profile stored in memory, or displays the guide content to the user of the terminal. |
| BroadcastArea | BroadcastArea parameter describes a broadcast area to which the terminal belongs among the qualifications of a panel capable of participating in a specific audience measurement if a value of ServiceType parameter is "11" (audience measurement). The terminal verifies a qualification by checking a broadcast network or Geo-location (using GPS, OMA SUPL, etc.) to which the terminal belongs if there exists BroadcastArea parameter. |

TABLE 3-continued

| Name | Description |
|---|---|
| TermsOfUse | TermsOfUse parameter represents Terms-of-Use for a specific audience measurement campaign if a value of ServiceType parameter is "11" (audience measurement). |

Panel Invitation Request Message

The panel invitation request message may be configured as illustrated in Table 4 as follows.

TABLE 4

| Name | Description |
|---|---|
| campaignID | ID of an audience measurement campaign |
| requestID | ID of a specific audience measurement campaign participation request message |
| userRefusal | Set to True if the user refuses to participate in the campaign. |
| UserID | User ID |
| type | Type of user ID (username defined in 0-RFC2865, 1-IMSI, 2-URI, 3-IMPI, 4-MSISPN, 5-MIN) |
| DeviceID | Terminal ID (0: IMEI, 1: MEID) |
| Type | Type of terminal ID |
| BSMID | ID of AM-M |

Audience Measurement Campaign Participation Request Message

The audience measurement campaign participation request message may be configured as illustrated in Table 5 as follows. The audience measurement campaign participation request message can be referred as Audience Measurement Request Message.

TABLE 5

| Name | Description |
| --- | --- |
| AudienceMeasurementCampaignParticipationRequest | Includes following attributes.<br>campaignID, requestID, userConsent<br>Includes following elements.<br>UserID, DeviceID |
| campaignID | Identifier of an audience measurement campaign<br>Matches to campaignID of the audience measurement campaign participation request message |
| requestID | Identifier of an audience measurement campaign participation request message |
| userConsent | Set to True if the user agrees to participate in the campaign. Set to False, or this element may be omitted if the user refuses to participate in the campaign |
| UserID | Identifier of the user known to BSM. Includes following types. |
| type | User name according to 0 —[RFC 2865], 1: IMSI, 2: URI, 3: IMPI, 4: MSISDN, 5: MIN, 6-127: reserved |
| DeviceID | Unique device identifier known to BSM. Includes following types. |
| type | 0: reserved, 1: IMEI [3GPP TS 23.003], 2: MEID [3GPP2 C.S0072], 3-127: reserved |

Panel Participation Response Message

TABLE 6

| Name | Description |
| --- | --- |
| AudienceMeasurementCampaignParticipationResponse | Audience measurement campaign response message |
| campaignID | ID of an audience measurement campaign (may be omitted if synchronized protocol is used such as HTTP) |
| BSMID | ID of AM-M (may be omitted if synchronized protocol is used such as HTTP) |
| requestID | ID of an audience measurement campaign request message |
| GlobalStatusCode | Processing result of the request message (0: success, 1: error) |
| AMConfigurationContainer | Container of configuration information |

The panel participation response message may include requestID, campaign ID, and processing result, and may further include AM configuration container, and BSMID. The requestID is an ID of the corresponding participation request message, and BSMID is an ID of BSM to which AM-M component belongs. The processing result is expressed by success or error, and the description for the error along with an error code will be included in case of an error. The AM configuration information container may include audience measurement configuration information (AMConfigurationData which will be described later), or may include session information (ip address, port, session id, TOI, etc.) or URL.

Audience Measurement Campaign Participation Response Message

The Audience Measurement Campaign Participation Response Message can be referred as the Audience Measurement Response message.

TABLE 7

| Name | Description |
| --- | --- |
| AudienceMeasurementCampaignParticipationResponse | Includes following attributes.<br>requestID, globalStatusCode<br>Includes following elements<br>Configuration Data |
| requestID | Represents an identifier of the corresponding audience measurement campaign participation message |
| globalStatusCode | Status value representing the result of the request. Terminal regards that a campaign having userID has been finished if the value is not "000" (success). |
| AudienceMeasurementConfigurationData | Parameter for configuring a terminal for a campaign |

The audience measurement campaign participation response message may include configuration information such as AudienceMeasurementConfigurationData. Therefore, it may be possible to omit the AM configuration process (S300) in FIG. 6.

Figure 6:
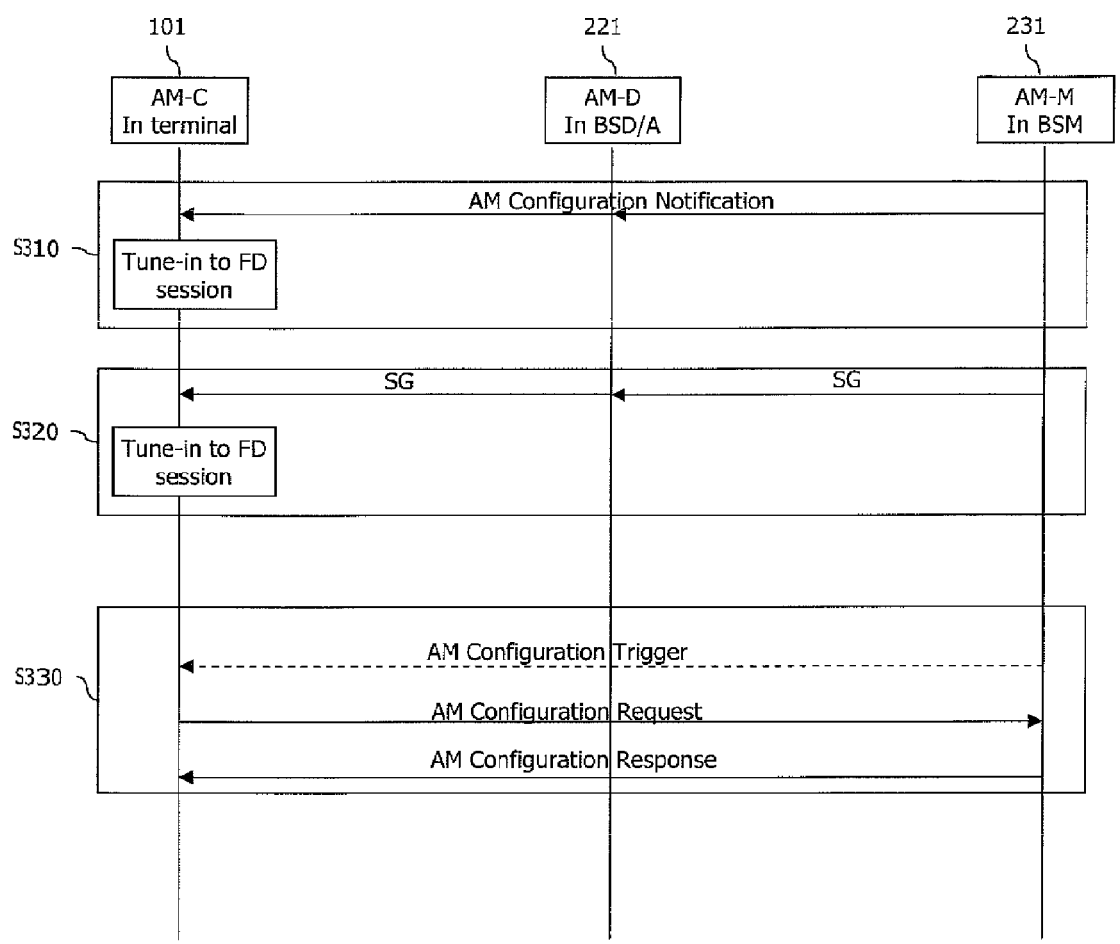
FIG. 6 is a flow chart schematically illustrating the AM configuration process (S300) illustrated in FIG. 2.

FIG. 6 is a flow chart schematically illustrating the AM configuration process (S300) illustrated in FIG. 2.

Referring to FIG. 6, the AM configuration process (S300) may be implemented by any one of the steps of transmitting a configuration notification message (S310), transmitting configuration information through a service guide (S320), and performing a configuration information acquisition protocol (S330).

Specifically, the process will be described as follows.

1) The AM-M 231 transfers a configuration information notification message including newly generated or changed configuration information, for instance, AM Configuration Notification message, to the AM-C 101 through the AM-D 221, namely, a broadcast network.

If the notification information notification message is received, then the AM-C 101 checks whether or not the notification message is for its own sake using campaignID in the notification message (i.e., checks whether or not there is AM Context matched to campaignID), and then compares with a version of configuration information in the audience measurement context corresponding to AM_CMP_ID, and then acquires and updates, or newly generates configuration information, thereby finishing the process. The AM-C 101 tunes in the relevant FD session to acquire configuration information if the configuration information notification message refers to a file directory (FD) session, and the AM-C 101 retrieves AM configuration data in the message to store in the audience measurement context if the AM configuration data exists in the notification message.

2) On the other hand, in the step of transmitting configuration information through a service guide (S320), the AM-C 101 checks whether or not the service guide is for its own sake using campaignID included in the content fragment, and then compares a version of configuration information in the service guide with a version of configuration information in the audience measurement context corresponding to the existing campaignID, and then tunes in a file delivery (FD) session through an access fragment indicated by the content fragment and acquires and updates, or newly generates configuration information if the version of configuration information in the service guide is higher. The configuration information in the FD session is transferred using ALC or FLUTE/ALC.

3) On the other hand, the step of performing a configuration information acquisition protocol (S330) will be described as follows.

The AM-M 231 selectively transmits a configuration information trigger message, for instance, AM Configuration Trigger message, to the AM-C 101 through an interactive network to start an acquisition of configuration information.

If the configuration information trigger message is received, then the AM-C 101 generates a configuration information request message, for instance, AM Configuration Request message, to transmit to the AM-M 231.

Alternatively, even if the configuration information trigger message is not received, the AM-C 101 transmits a configuration information request message, for instance, AM Configuration Request message, to the AM-M 231 for the configuration information suitable for the terminal if the foregoing panel participation response message in FIG. 5 does not include an AM configuration container.

If the configuration information request message is received, then the AM-M 231 checks campaignID in the configuration information request message to check whether or not the AM-C 101 is a panel of the audience measurement campaign corresponding to the campaignID. Then, if version information in the configuration information request message is included, then the AM-M 231 checks whether or not the AM-C 101 has the latest AM configuration already through the version comparison. If it has the latest version already by the check result, the AM-M 231 transmits an AM configuration response in which the processing result is "fail" and the error code is "latest version", thereby finishing the process.

Subsequently, if there is no problem in processing the foregoing message, the AM-M 231 generates a configuration information response message, for instance, AM Configuration Response message in which the processing result is "Success" to transmit to the AM-C 101. At this time, the configuration information response message may include configuration information (AM Configuration) corresponding to the AM_CMP_ID.

If the configuration information response message is received, then the AM-C 101 checks the processing result in the configuration information response message. If the processing result is "Success", then the AM-C 101 compares a version of configuration information included in the configuration information response message with its own version and then updates or newly stores configuration information.

Otherwise, if configuration information in the received configuration information response message notifies the completion of an audience measurement campaign (for example, the content of AM configuration may be vacant or the end time of AM campaign in the content of AM configuration may be displayed to be the past), then the AM-C 101 deletes the configuration information that has been stored therein and its associated audience measurement context, and regards the panel qualification for the campaign as being lost, and does not carry out the audience measurement of the campaign any longer.

4) If the AM-C 101 successfully receives the configuration information as one of the above three steps, then the AM-C 101 carries out an audience measurement as defined in the AM configuration (for example, recorded whenever Service/Content is started/changed, the current action is recorded for each 10 seconds).

Configuration Information Notification Message

The configuration information notification message (AM Configuration Notification) may include an eventType attribute. The eventType attribute is set to "9", and it may include an AMConfigInfo element. The AMConfigInfo element may include CampaignID, version, AMConfContainer. The version element may include version information of the configuration information. The AMConfContainer may include a sessionInfo element, URL element, or AMConfiguration element. The sessionInfo element session information (IP address, port, TOI, etc.) for receiving the configuration information through a broadcast channel, and the URL element may include an address of the AM-M 231 for receiving the configuration information, and the AMConfiguration element may include an AM container in the form of a text string in the message.

Hereinafter, the foregoing messages will be described in detail as follows.

Configuration Information Trigger Message

The configuration information trigger message (AM Configuration Trigger message) is a trigger message by which the AM-M 231 instructs the AM-C 101 to receive configuration information.

The configuration information trigger message may include CampaignID, version information of the configuration information, and a URL of the AM-M, and may further include a value of MAC. The URL of the AM-M is an address capable of downloading configuration information.

If the configuration information trigger message is received, then the AM-C 101 checks flawlessness through the verification of MAC if there exists the MAC of the message, and compares a version of configuration information in the audience measurement context corresponding to the Campaign ID with a version in the configuration information trigger message.

Configuration Information Request Message

The configuration information request message (AM Configuration Request) may include RequestID, an ID of BSM, a terminal ID, a user ID, CampaignID, a version of the configuration information, and may further include a digital signature for the message. If the trigger message is not received, then the AM-C 101 is allowed not to include the nonce in the request message.

Configuration Information

The configuration information (AM configuration data) may be illustrated in Table 8 as follows.

TABLE 8

| Name | Description |
| --- | --- |
| version | Versioin of configuration information |
| CampaignInfo | Information for an audience measurement campaign |
| startTime | Start time of an audience measurement campaign |
| endTime | End time of an audience measurement campaign |
| CampaignID | ID of an audience measurement campaign |
| MeasurementInfo | Information for an audience measurement |
| startTime | Time for starting an audience measurement |
| WhatToMeasure | Target event of an audience measurement |
| ServiceConsumption | Viewing of a service that should be monitored by a terminal |
| ProgramConsumption | Viewing of a program that should be monitored by a terminal |
| Zapping | Zapping that should be monitored by a terminal (zapping: movement between services and programs) |
| Recording | Recording that should be monitored by a terminal |
| SignalStrength | Signal strength that should be monitored by a terminal |
| EncryptionKey | Encryption key used for encrypting an audience measurement report, for example, security or public key |
| ReportInfo | Policy for an audience measurement report |
| startTime | Start time of an audience measurement report |
| ServerAddressURL | URL of a server to which an audience measurement report should be transmitted |
| UserConsentRequired | User's consent is required or not for an audience measurement report (true/false) |
| Frequency | Period of time until a final report should be transmitted |
| DataThreshold | Expressed as a data size limiting the size of a report, or the number of reporting events |
| TriggeredReport | Execution of reporting when the AM-C receives a transmission request notification message or report transmission request trigger message |

Figure 7:
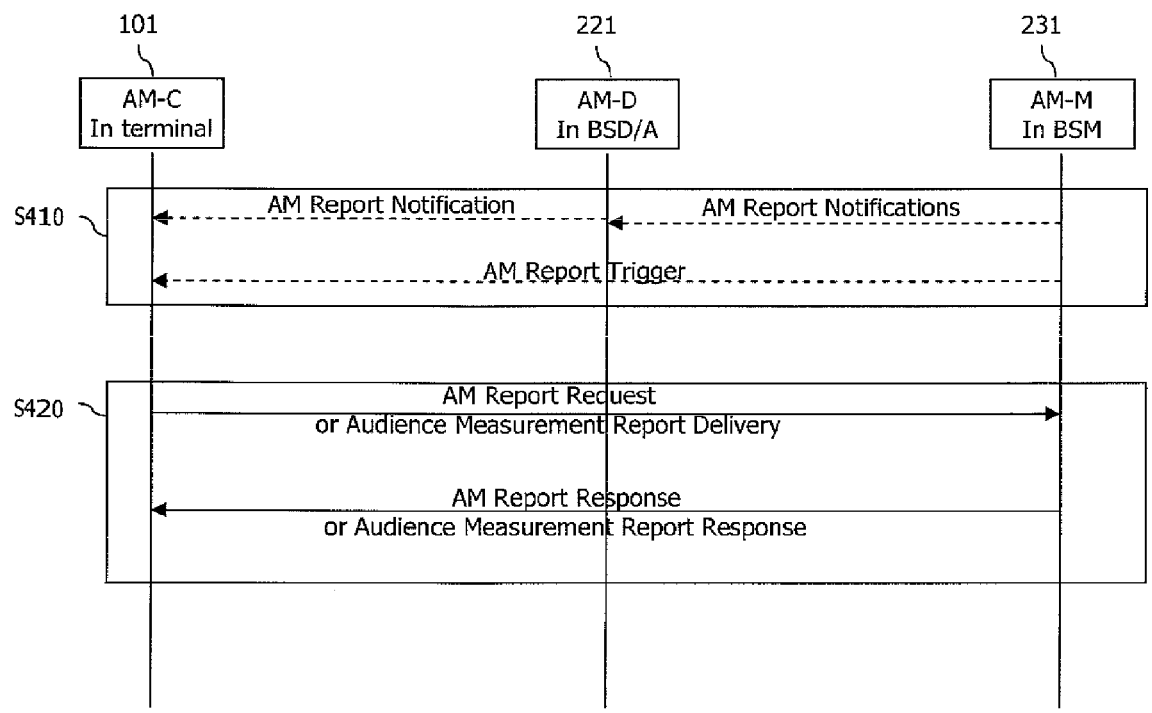
FIG. 7 is a flow chart schematically illustrating the AM report process (S400) illustrated in FIG. 2.

FIG. 7 is a flow chart schematically illustrating the AM report process (S400) illustrated in FIG. 2.

Referring to FIG. 7, the AM report process (S400) can be performed any one of the steps of transmitting a report transmission request notification message (S410), and performing a report transmission protocol (S420).

Specifically, the process will be described as follows.

1) If the report time is indicated as when receiving a report request notification message, for instance, AM Report Notification message, or report request trigger message, for instance, AM Report Trigger message, in the configuration information (there exists a TriggeredReport element), then the AM-C 101 waits for receiving the report request notification message or report request trigger message. Furthermore, the AM-C 101 proceeds into the step 2) when a predetermined condition (report period, etc.) indicated by the configuration information and an audience measurement campaign is completed.

After the AM-C 101 receives a report request notification message, for instance, AM Report Notification message, or report request trigger message, the AM-C 101 check whether the message is for itself by using the Campaign ID.

If it is indicated that the user's confirmation is required in the messages (in case where a value of UserConsentRequired is "True", then the AM-C 101 obtains the user's consent.

2) Hereinafter, the AM-C 101 collects audience measurement data stored therein to generate a report transmission request message, and then transmits the generated message to a URL of the AM-M 231. At this time, in case where the notification message or the trigger message has requestURL, the requestURL will be a URL of the AM-M 231, otherwise the AM-M 231 URL in the audience measurement context will be a URL of the AM-M 231.

3) If the report transmission request message is received, then the AM-M 231 checks whether or not the AM-C 101 is a panel corresponding to campaignID. Subsequently, the AM-M 231 generates a report response message, for instance, AM Report Response message to transmit to the AM-C 101.

4) If the report response message is received, then the AM-C 101 checks the processing result in the report response message. If the processing result is "Success", then the AM-C 101 deletes the result of the audience measurement. If the result is "Failure", then the AM-C 101 can proceeds into the step 2).

5) The AM-C 101 continues to collect audience measurement data, and proceeds into the step 1) again.

Hereinafter, the foregoing messages will be described in detail as follows.

Report Transmission Request Notification Message

The report transmission request notification message has an AMReport element. The AMReport element may include a campaignID element and a requestURL element, and may further include BSMID. The requestURL attribute indicates an address of the AM-M for receiving a report transmission request message.

Report Transmission Request Trigger Message

The report transmission request trigger message may be illustrated in Table 9 as follows.

TABLE 9

| Name | Description |
| --- | --- |
| AudienceMeasurementReportTrigger | Includes following elements.<br>BSMID, DeviceID, CampaignID, ServerAddressURL |
| BSMID | Identifier of BCAST AM-M known to BCAST AM-C |
| DeviceID | Unique identifier of a terminal known to BSM.<br>Includes a Type attribute. |
| type | 0: reserved, 1: IMEI [3GPP TS 23.003], 2: MEID [3GPP2C.S0072]<br>3-127: reserved |
| CampaignID | Identifier of an audience measurement campaign |

Report Transmission Request Message

The report transmission request message may be illustrated in Table 10 as follows.

TABLE 10

| Name | Description |
| --- | --- |
| campaignID | ID of an audience measurement campaign |
| requestID | ID of a report transmission request message |
| UserID | User ID |
| Type | Type of user ID |
| DeviceID | Terminal ID |
| Type | Type of terminal ID |
| AudienceMeasurementReport | aAudience measurement report |
| ServiceConsumptionMeasuremntEvent | Service consumption measurement event |
| startTime | Start time of viewing |
| endTime | End time of service |
| serviceID | Service ID |
| ContentID | Content ID |
| RecordingConsumptionMeasurementEvent | Recording consumption measurement event |
| recordingStartTime | Start time of recording |
| recordingEndTime | End time of recording |
| startTime | Start time of viewing |
| endTime | End time of viewing |
| serviceID | ID of viewed service |
| ContentID | Viewed content ID |
| InteractiveConsumptionMeasurementEvent | Interactive consumption measurement event |
| startTime | Start time of viewing |
| endTime | End time of viewing |
| serviceID | ID of viewed service |
| ContentID | Viewed content ID |

Audience Measurement Campaign Report Transfer Message

The audience measurement campaign report transfer message may be illustrated in Table 11 as follows.

TABLE 11

| Name | Description |
| --- | --- |
| AudienceMeasurementReportDelivery | Includes campaignID and requestID attributes.<br>Includes UserID DeviceID,<br>ServiceConsumptionMeasurementEvent,<br>RecordingConsumptionMeasurementEvent,<br>ProprietaryMeasurementEvent elements. |
| campaignID | Identifer of an audience measurement campaign |
| requestID | Identifer of an audience measurement report transmission message |
| UserID | User ID known to BSM |
| DeviceID | Unique device identifier known to BSM |
| version | Version of the current configuration information |
| ServiceConsumptionMeasuremntEvent | Includes a globalServiceIDRef attribute.<br>Includes GlobalContentIDRef, Start, and End elements. |
| globalServiceIDRef | ID of consumed service. This ID is a global service ID. |
| GlobalContentIDRef | ID of consumed content. This ID is a global content ID. |
| Start | Information for consumption start<br>Includes Time, Location elements. |
| time | Time at which consumption is started |
| Location | Location at which consumption is started<br>Includes Point, Cell elements. |

TABLE 11-continued

| Name | Description |
|---|---|
| Point | Coordinate of the position at which consumption is started |
| Cell | Target region to which contents are distributed |
| | Includes a Type attribute and a CellArea element. |
| CellArea | Transmission region for each BDS |
| | Includes a Value attribute and a PP2CellID element. |
| value | Value of a cell ID |
| PP2CellID | If type = 6, then this value is Sector__ID. |
| | If type = 7, 8, 9 or 10, then this value is BASE ID. |
| End | Information for the completion of consumption |
| | Includes a Time attribute and a Location element. |
| time | Time at which consumption is completed |
| Location | Location at which consumption is completed |
| | Includes a sameAsStart attribute, and Point, Cell elements. |
| sameAsStart | Indicate that consumption is completed at the same position as a position at which consumption is started |
| Point | Coordinate of the position at which consumption is started |
| Cell | Target region to which contents are distributed |
| | Includes a Type attribute and a CellArea element. |
| CellArea | Transmission region for each BDS |
| | Includes a Value attribute and a PP2CellID element. |
| value | Value of a cell ID |
| PP2CellID | If type = 6, then this value is Sector__ID. |
| | If type = 7, 8, 9 or 10, then this value is BASE ID. |
| RecordingConsumptionMeasurementEvent | Includes a globalServiceIDRef attribute, a GlobalContentIDRef element, a Recording element, a Start element, and an End element. |
| globalServiceIDRef | ID of consumed service. This ID is a global service ID. |
| GlobalContentIDRef | ID of consumed content. This ID is a global content ID. |
| Recording | Information for recording |
| | Includes a Start element and an End element. |
| Start | Information for recording start |
| | Includes a Time element and Location element. |
| time | Start time of recording |
| Location | Location at which consumption is started |
| | Includes a Point element and a Cell element. |
| End | Information for recording start |
| | Includes a Time element and Location element. |
| time | End time of recoding |
| Location | Position at which consumption is completed |
| | Includes a Point element and a Cell element. |
| Consumption | Information for consumption |
| Start | Information for consumption start |
| time | Position at which recorded content consumption has been started |
| End | Information for the end time of consumption |
| time | Position at which recorded content consumption has been completed |

Report Transmission Response Message or Audience Measurement Report Response Message The report transmission response message or audience measurement report response message may be illustrated in Table 12 as follows.

TABLE 12

| Name | Description |
|---|---|
| campaignID | ID of an audience measurement campaign (may be omitted if synchronized protocol is used such as HTTP) |
| requestID | ID of a message |
| Global Status Code | Processing result |

Figure 8:
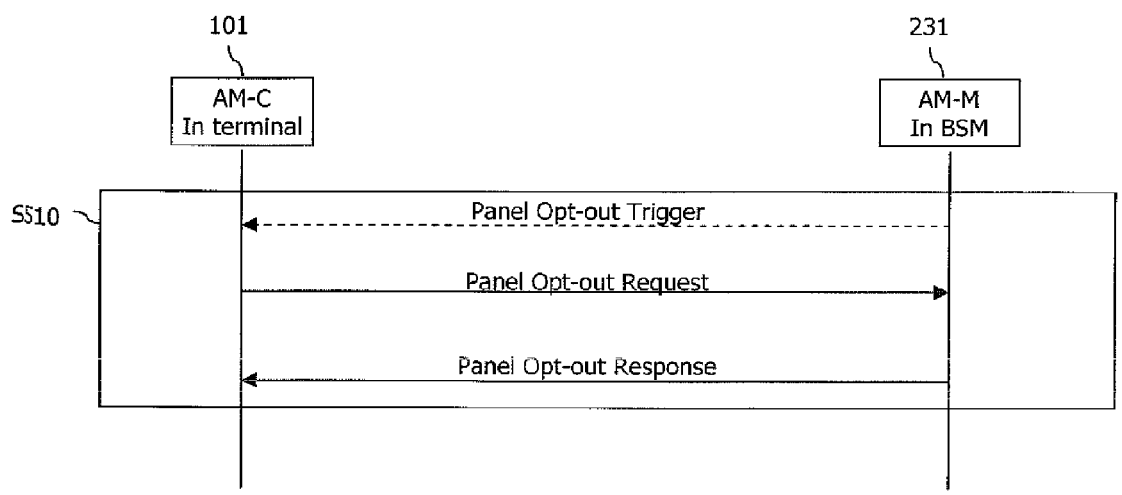
FIG. 8 is a flow chart schematically illustrating the AM panel opt-out process (S500) illustrated in FIG. 2.

FIG. 8 is a flow chart schematically illustrating the AM panel opt-out process (S500) illustrated in FIG. 2.

Referring to FIG. 8, the AM panel opt-out process (S500) may include the steps of transmitting a panel opt-out request trigger message, transmitting a panel opt-out request message, and transmitting a panel opt-out response message.

Specifically, the process will be described as follows.

1) In case where the user of the terminal requests the opt-out of a panel through a portal site operated by a service provider or through other methods, the AM-M 231 transmits a panel opt-out request trigger message, for instance, Panel Opt-out Trigger, to the AM-C 101. Otherwise, if the audience measurement campaign is completed, then the AM-M 231 transmits the trigger message.

2) The AM-C 101 obtains the user's consent, and generates a panel opt-out request message, for instance, Panel Opt-out Request message to transmit to the AM-M 231.

At this time, the panel opt-out request message may be transmitted in response to receiving the trigger message, but may be also transmitted in case where the user of the terminal wants to be opted out even if the trigger message is not received.

The AM-C 101 may further include an all_am_campaign parameter in the panel opt-out request message. Furthermore, AM-C 101 may further include a do_not_bother_me_again parameter in the panel opt-out request message.

3) If the panel opt-out request message is received, then the AM-M 231 checks AM_CMP_ID in the request message to check whether or not the AM-C 101 is a panel corresponding to the AM_CMP_ID. Then, the AM-M 231 opts out the AM-C 101 and deletes its related information. On the other hand, in case where there is no AM_CMP_ID in the request message, the AM-M 231 checks whether or not the AM-C 101 is its own managed panel, and then opts out the AM-C 101 from panels of all the campaigns associated with the AM-C 101.

If the all_am_campaigns is included in the panel opt-out request message, then the AM-M 231 deletes the AM-C 101 from all the campaigns to which the AM-C 101 belongs.

If the do_not_bother_me_again parameter is included in the panel opt-out request message, then the AM-M 231 stores an ID of the AM-C 101 that has transmitted the message, and omits the relevant AM-C 101 from the invitation of subsequent audience measurement campaigns.

Then, the AM-M 231 generates a panel opt-out response message, for instance, Panel Opt-out Response message, to transmit to AM-C 101.

4) If the panel opt-out response message is received, then the AM-C 101 checks the processing result. If the processing result is "Success", then the AM-C 101 deletes an audience measurement context corresponding to the AM_CMP_ID in the response message and its related data. At this time, if the AM_CMP_ID is not included in the message, then the AM-C 101 deletes all the audience measurement contexts corresponding to the ID of the AM-M 231 and their related data.

Hereinafter, the foregoing messages will be described in detail as follows.

Panel Opt-Out Request Trigger Message

The panel opt-out request trigger message transferred to the AM-C through an interactive channel may be illustrated in Table 13 as follows.

TABLE 13

| Name | Description |
|---|---|
| allCampaign | Indicates whether or not AM-C is desired to be opted out from all the audience measurement campaigns |
| BSMID | ID of AM-M |
| DeviceID | ID of AM-C |
| Type | Type of DeviceID |
| CampaignID | ID of an audience measurement campaign (used when there is no allCampaign) |
| ServerAddressURL | URL of AM-M |

Panel Opt-Out Request Message

TABLE 14

| Name | Description |
|---|---|
| requestID | ID of a panel opt-out request message |
| allCampaign | Indicates whether or not the opt-out of a panel is desired from all the audience measurement campaigns |
| BSMID | ID of AM-M |
| DeviceID | Terminal ID |
| Type | Type of terminal ID |
| UserID | User ID |
| Type | Type of user ID |
| CampaignID | ID of an audience measurement campaign |
| do_not_bother_me_again | Request for exempting from the AM campaigns to be performed by AM-M from now on |

Panel Opt-Out Response Message

TABLE 15

| Name | Description |
|---|---|
| requestID | ID of a panel opt-out message |
| Global Status Code | Processing status |

Figure 9:
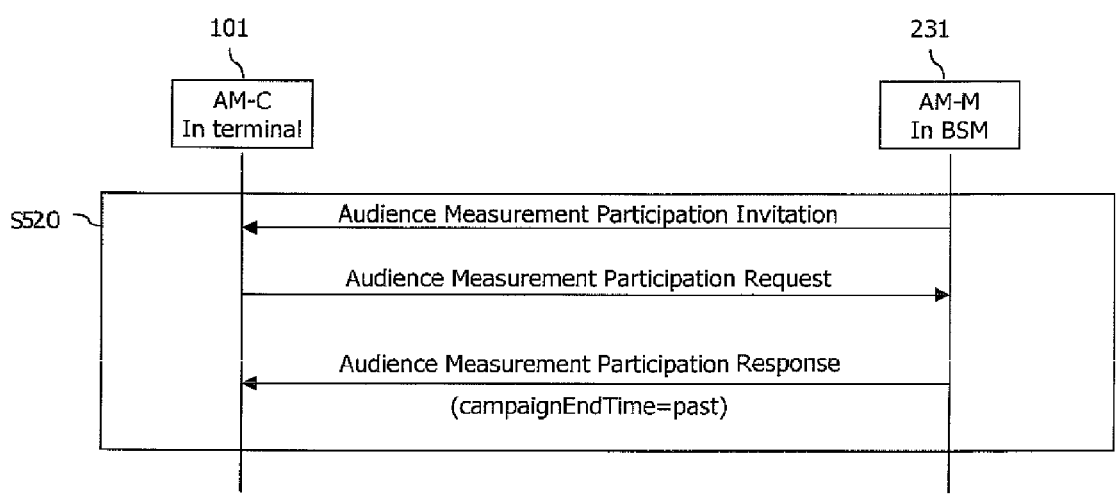
FIG. 9 is another example of the AM panel opt-out process (S500) illustrated in FIG. 2.

FIG. 9 is another example of the AM panel opt-out process (S500) illustrated in FIG. 2.

Referring to FIG. 9, the AM panel opt-out process (S500) may be accomplished by using an audience measurement participation invitation message, an audience measurement participation invitation request message, and an audience measurement participation invitation response message.

For example, the AM-M 231 transmits an audience measurement campaign participation invitation message in which the consentRequired element is set to "True". The AM-C 101 displays whether to opt-out or not to opt-out, and transmits the audience measurement participation request message including a value of "refuse" to the AM-M 231 if a response to the opt-out is received from the user. The AM-M 231 transmits an audience measurement campaign response message configuration information, for example, AM Configuration Data including a campaignEndTime element in which the campaign end time is set to the past time to the AM-C 101. Thereby, the AM-C 101 is regarded as being opted out from the audience measurement campaign. The configuration information further includes information such as Table 8. The AM-C 101 compares the end time specified in the third element with a current time in response to the reception of the campaign participation response message. In more detail, AM-C 101 compares an identification specified in the first element with an identification of the currently participating campaign. If the identifications are matched each other, the AM-C 101 the end time specified in the third element with a current time. If the end time is past, the AM-C 101 reports measurement data stored therein to the server and stops participating the campaign for the audience measurement after the report. And then, the AM-C 101 deletes the stored measurement data of the campaign.

For another example, if the AM-M 231 transmits an audience measurement campaign invitation message in which the consentRequired element is set to "False" to the AM-C 101, then the AM-C 101 transmits an audience measurement campaign request message in which the userConsent element has a value of "agree" to the AM-M 231. Then the AM-M 231 transmits an audience measurement campaign response message including a campaignEndTime element in which the campaign end time is set to the past time to the AM-C 101. Thereby, the AM-C 101 is regarded as being opted out from the audience measurement campaign.

The method according to the present invention as described above may be implemented by software, hardware, or a combination of both. For example, the method according to the present invention may be stored in a storage medium (e.g., mobile terminal's internal memory, flash memory, hard disk, and so on), and may be implemented through codes or instructions in a software program that can be performed by a processor (for example, mobile terminal's internal microprocessor).

Though preferred embodiments of present invention are exemplarily described as disclosed above, the scope of the invention is not limited to those specific embodiments, and thus various modifications, variations, and improvements can be made in the present invention without departing from the spirit of the invention, and within the scope of the appended claims.

The invention claimed is:

1. A method of measuring audience ratings for at least more than one service and content, the method comprising:
transmitting a campaign invitation message to a terminal having already participated in a campaign for audience measurement, wherein the campaign invitation message includes at least one of a first element specifying an identification of the campaign for the audience measurement, and a second element specifying whether a consent of a user is required or not;

receiving, from the terminal, a campaign participation request message including a third element specifying the identification of the campaign for the audience measurement, wherein the identification of the third element is matched with the identification of the second element;

transmitting, to the terminal, a campaign participation response message from a server, wherein the campaign participation response message includes a configuration data for the audience measurement, the configuration data includes at least one of a fourth element specifying the identification of the campaign for the audience measurement, a fifth element specifying a start time of the campaign and a sixth element specifying a value indicating an end time of the campaign, wherein the end time is set to past; and receiving, from the terminal, measurement data after transmitting the campaign participation response message.

2. The method of claim 1, wherein the campaign invitation message is transmitted via a service guide on a broadcast channel or received via a service guide on a unicast channel.

3. The method of claim 1, wherein the configuration information comprises information for a report of the audience measurement result.

4. The method of claim 1, wherein the campaign participation request message further includes:

an element related to the consent of the user.

5. A server for measuring audience ratings for at least more than one service and content, the server comprising:

a transmitter configured to transmit a campaign invitation message to a terminal having already participated in a campaign for audience measurement, wherein the campaign invitation message includes at least one of a first element specifying an identification of the campaign for the audience measurement, and a second element specifying whether a consent of a user is required or not; and a receiver configured to receive, from the terminal, a campaign participation request message including a third element specifying an identification of the campaign for the audience measurement, wherein the identification of the third element is matched with the identification of the second element, wherein the transmitter is further configured to transmit, to the terminal, a campaign participation response message, wherein the campaign participation response message includes a configuration data for the audience measurement, the configuration data includes at least one of a fourth element specifying the identification of the campaign for the audience measurement, a fifth element specifying a start time of the campaign and a sixth element specifying a value indicating an end time of the campaign, wherein the end time is set to past, and wherein the receiver is further configured to receive, from the terminal, measurement data after transmitting the campaign participation response message.

6. The method of claim 5, wherein the campaign invitation message is transmitted via a service guide on a broadcast channel or received via a service guide on a unicast channel.

7. The method of claim 5, wherein the configuration information comprises information for a report of the audience measurement result.

8. The method of claim 5, wherein the campaign participation request message further includes:

an element related to the consent of the user.

* * * * *